July 16, 1968  H. RAMI  3,392,490

HYDRAULIC GATE

Filed Feb. 14, 1966

INVENTOR

HEINZ RAMI

BY

ATTORNEYS

United States Patent Office 3,392,490
Patented July 16, 1968

3,392,490
HYDRAULIC GATE
Heinz Rami, Vienna, Austria, assignor to Simmering-Graz-Pauker Aktiengesellschaft für Maschinen-, Kessel- und Waggonbau, Vienna, Austria
Filed Feb. 14, 1966, Ser. No. 527,032
Claims priority, application Austria, Feb. 15, 1965, A 1,301/65
1 Claim. (Cl. 49—465)

ABSTRACT OF THE DISCLOSURE

A gate for sealing an opening between two areas and movable to and from sealing position by generally vertical movement. Sealing means on the gate is sealingly engaged with the frame bordering the opening by latching means that is operated by means for vertically moving the gate.

Background of the invention

In the previous gates, the sealing rubber is compressed directly by the weight of the separating gate. For this purpose, the separating gate must be trapezoidal. The sealing bead is provided on the trapezoidal periphery of the gate and is subjected to very great wear by frequent opening and closing of the separating gate because the bead slides on the seat surfaces while the bead is being compressed. Besides, the seal between the two compartments is not always ensured to the required extent because the sealing bead is expanded owing to the action of friction at the lower corners of the separating gate so that the required contact pressure is no longer applied. It must also be taken into account that the manufacture of a trapezoidal separating gate is much more expensive than that of a rectangular gate.

Summary of the invention

Briefly, a gate according to the persent invention comprises a gate panel cooperative with a frame surrounding an opening between two areas. Sealing means is provided on one face of the gate panel for sealing engagement with the frame. The gate panel carries a plurality of vertically spaced pairs of locking bolts extensible from both sides thereof and the frame has a corresponding plurality of vertically spaced pairs of keepers in both sides thereof for cooperation with said bolts respectively. The bolts each include a wedge engageable with the respective keeper to cam the gate panel into sealing engagement with the frame and each pair of bolts is interconnected by a toggle linkage. The jointed knees of all of the toggle linkages are connected with means to withdraw the bolts and lift the gate panel, and spring means opposes movement of said lifting means and, upon release of the weight of the gate panel, extends said bolts into camming engagement with said keepers.

Detailed description of invention

Figure 1:
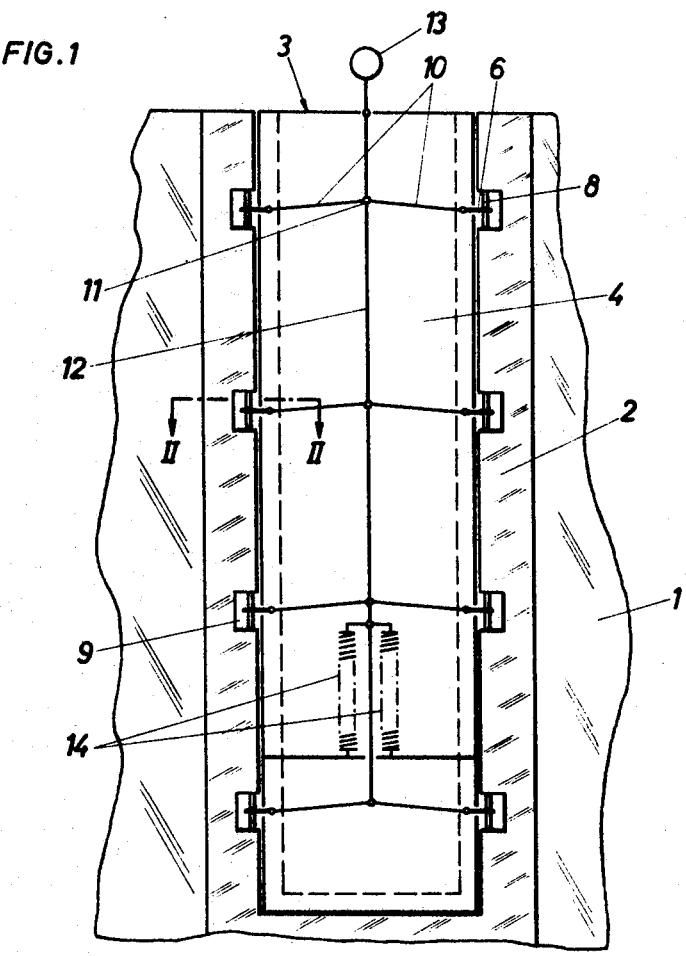
FIG. 1 is a highly diagrammatic elevation showing the gate.
Figure 2:
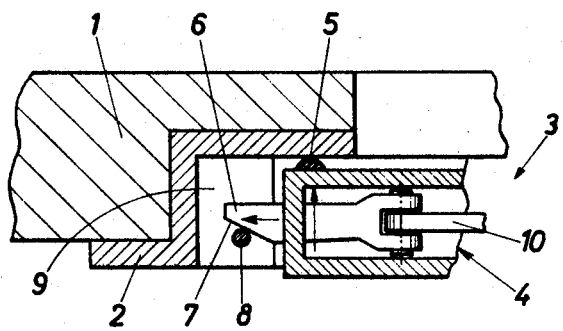
FIG. 2 is a sectional view taken on line II—II of FIG. 1, on a larger scale.

The wall 1 to be closed by the gate is provided with a frame 2, which surrounds an opening 3 in the wall. The gate panel 4 can be inserted into the opening 3 and has on its face which confronts the frame 2 a seal 5, preferably of rubber or the like yieldable material. Extensible and retractable locking bolts 6 are provided on the edges of the gate panel 4 and are formed with bevelled faces 7, which can cooperate like wedges with fixed keepers 8. These abutments are formed by pins, which are mounted in recesses or niches 9 in the frame 2.

To operate the gate, the two opposite locking bolts 6 of each pair are connected by two levers 10, which together form a toggle joint. The knee of the toggle joint is indicated at 11. A tie rod 12 is provided, which is connected to all knees 11 and couples the same for movement in unison. The tie rod 12 has at its upper end an eye 13 or the like, by which it can be connected to a crane or another device for inserting the gate panel into the frame and for lifting the gate panel out of the frame. The tie rod 12 is further connected to the gate panel by two tension springs 14, which oppose the weight of the gate panel and tend to pull the tie rod downwardly relative to the gate panel and at the same time to push the locking bolts outwardly. The force of the springs or the highest possible tension thereof must obviously be less than the weight of the gate panel.

To insert the gate panel into the opening in the wall 1 in the order to seal said opening, the gate panel is lifted with the aid of a crane or the like. The load hook of said crane is engaged with the eye 13. During the lifting of the gate panel, the tie rod is sufficiently raised relative to the panel until the springs are stressed to balance the weight of the gate panel or until the tie rod has completed its stroke, which is limited by stops. The gate panel is now inserted into the opening. During this insertion, the seal need not contact the frame. As soon as the panel rests on the lower member of the frame, the force of the springs lowers the tie rod further so that the locking bolts are pushed outwardly with the aid of the toggle joints. The bevelled faces of the latter move like wedges behind the fixed keepers so that the gate panel and more particularly its seal is forced against the frame.

To lift the gate panel out of the frame, the eye which is engaged by the crane hook and the tie rod is lifted to stress the springs whereas the panel itself is not moved. The movement of the tie rod relative to the gate panel causes a retraction of the locking bolts so that the gate panel is released from the keepers. A further lifting of the crane hook results then in a lifting of the gate panel out of the frame.

The automatic locking mechanism according to the invention ensures a uniform contact pressure between the gate and the seat surfaces, independently of the value of the pressure of the fluid to be shut off, and without a sliding of the seal on the seat surfaces.

What is claimed is:

1. A hydraulic gate comprising a frame surrounding an opening between two areas, a gate panel cooperative with said frame for closing the opening, said frame including a portion disposed parallel to the plane of the opening, said gate panel having on its face confronting said frame portion sealing means for sealing engagement with said frame portion, a plurality of vertically spaced, mutually opposite pairs of extensible locking bolts disposed respectively along the vertical side of edges of said gate panel, a plurality of vertically spaced pairs of keepers disposed respectively along both vertical sides of said frame for cooperation with said pairs of bolts respectively, said bolts each including a wedge portion engageable with the respective keeper for camming said gate panel and sealing means into sealing engagement with said frame portion upon extension of said bolts, a toggle linkage interconnected between each pair of opposite locking bolts, each said linkage having a pivotally jointed knee, a substantial vertical tie rod connected with all of the knees of said linkages, means on said tie rod for connection to a lifting element, and spring means connected between said tie rod ad said gate panel and which opposes the weight of said gate panel when the tie rod is pulled upward, the tension of said spring means being smaller than the weight of said gate panel to enable upward movement of tie rod relative to said gate panel to actuate said linkages to withdraw said bolts but said spring means having sufficient tension to lower said tie rod relative to said gate panel to actuate said linkages to extend said locking bolt wedge portions into engagement with said keepers to cam said gate panel and sealing means into sealing engagement with said frame portion.

References Cited

UNITED STATES PATENTS

| | | | |
|---|---|---|---|
| 2,565,856 | 8/1951 | Kerr | 292—21 |
| 2,577,348 | 12/1951 | McLaughlin | 292—5 XR |
| 3,290,888 | 12/1966 | Palmer et al. | 61—28 |

KENNETH DOWNEY, *Primary Examiner.*